Feb. 4, 1930. J. B. MORTON. JR 1,745,944
AUTOMOBILE PARKING SIGNAL
Filed Feb. 27, 1929   3 Sheets-Sheet 1

Inventor
John B. Morton, Jr.
By Clarence A. O'Brien
Attorney

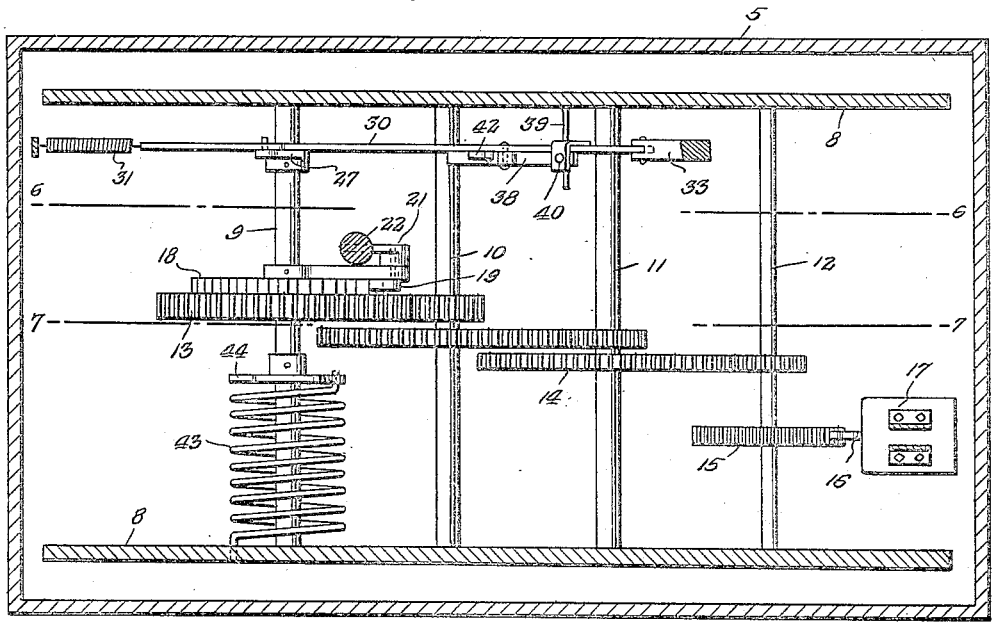
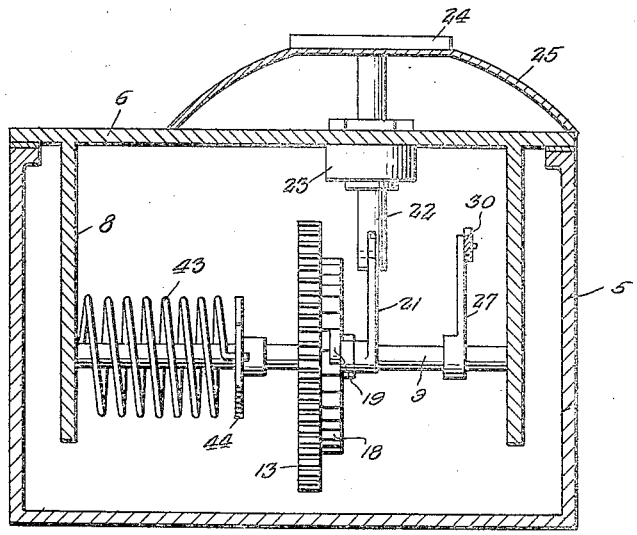

Feb. 4, 1930.                J. B. MORTON, JR                1,745,944
                         AUTOMOBILE PARKING SIGNAL
                    Filed Feb. 27, 1929        3 Sheets-Sheet 3
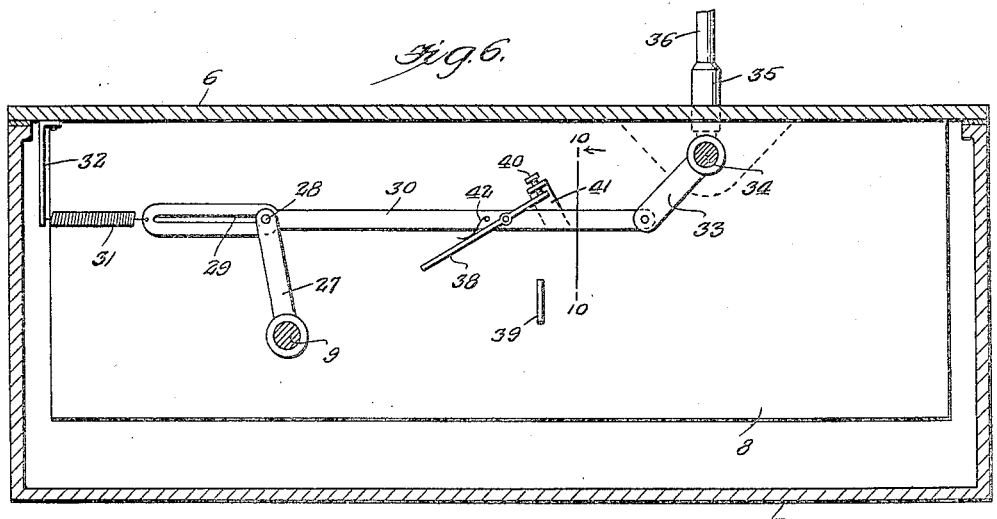
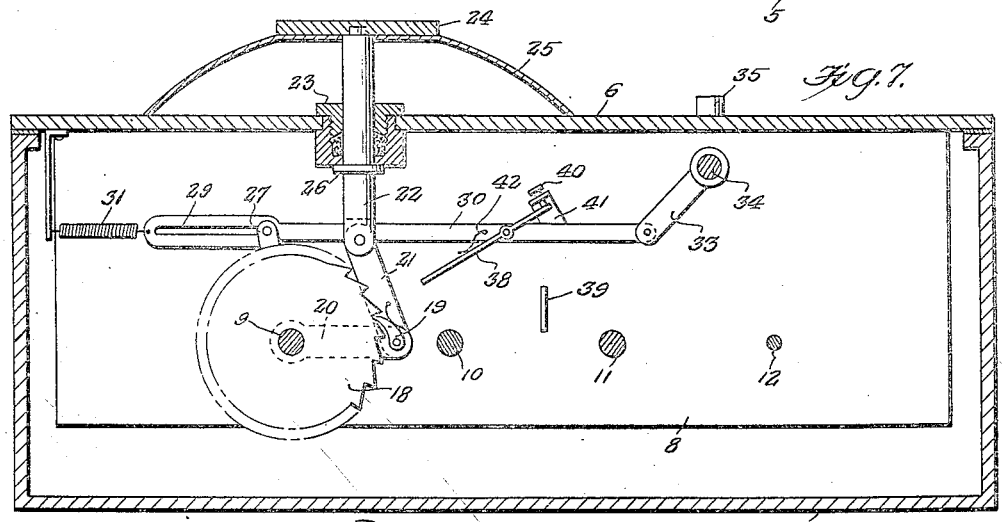
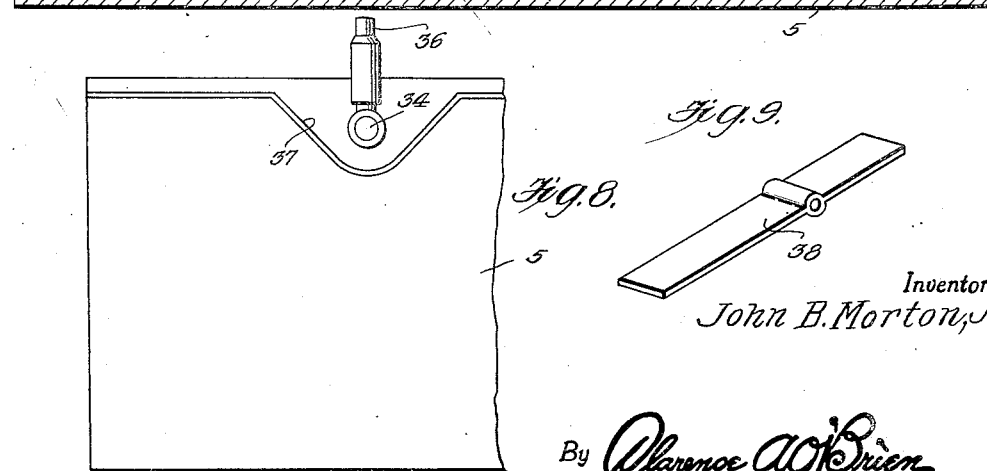
Inventor
John B. Morton, Jr.
By Clarence A. O'Brien
                Attorney Patented Feb. 4, 1930

1,745,944

UNITED STATES PATENT OFFICE

JOHN B. MORTON, JR., OF CHARLESTON, WEST VIRGINIA

AUTOMOBILE PARKING SIGNAL

Application filed February 27, 1929. Serial No. 342,938.

The present invention relates to parking signals for automobiles and is designed particularly for use in indicating accurately when the parking time of an automobile has expired. The invention is intended for use principally in cities where ordinances are enacted limiting the parking time of automobiles upon the streets and comprises a time controlled device having a signal arm operatively associated therewith and arranged to be set by the driver of the vehicle at the time the vehicle is parked so that at the expiration of a predetermined period the signal will be displayed so that traffic officers passing within view of the automobile will be informed that the parking time for the automobile has expired.

One of the important objects of the invention is to provide a device of this character which may be installed adjacent the street curbing line and placed in a recessed position either in the street or sidewalk and provided with a foot plunger operated by the motorist as he steps from his automobile for setting the time controlled mechanism.

A further object of the invention is to provide an apparatus of this character of a simple and practical construction, which is efficient and reliable in performance, which does not interfere with the movement of vehicles or pedestrians passing adjacent the device, which may be manufactured and installed at a relatively low cost, which is inexpensive to operate and otherwise well adapted to the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1:
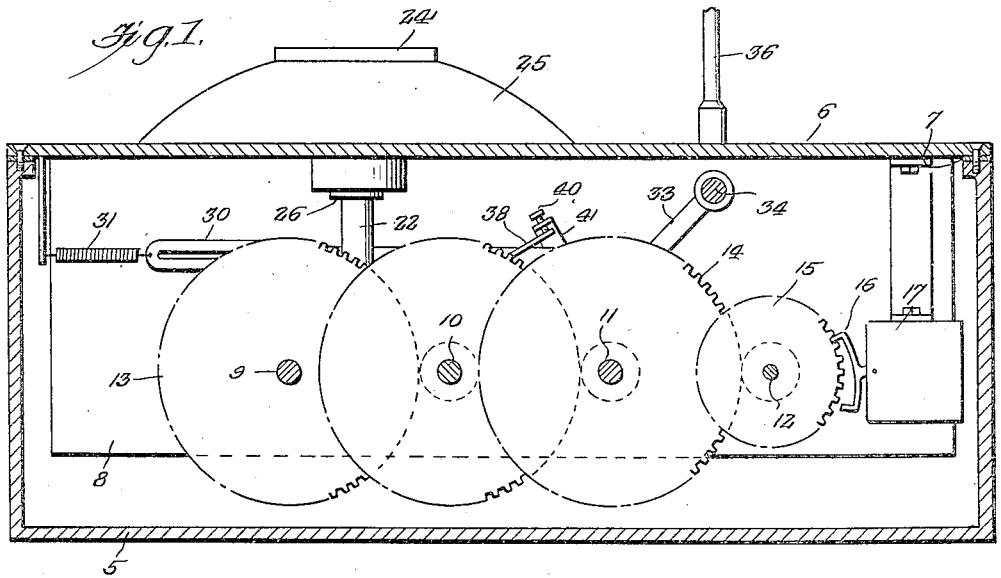
Figure 1 is a vertical sectional view through the container for the device.
Figure 2:
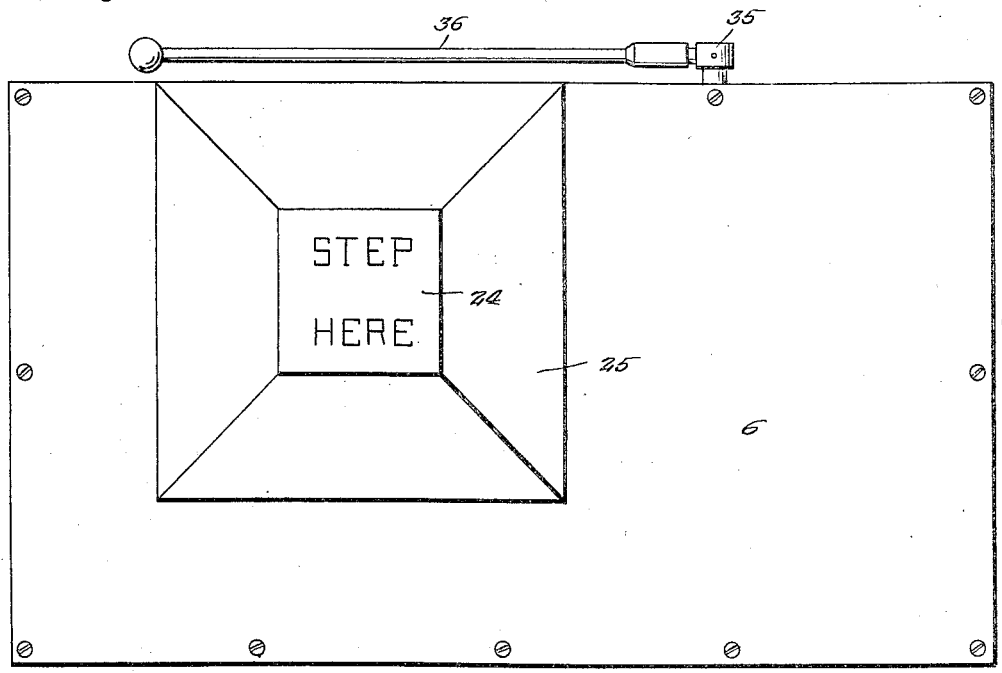
Figure 2 is a top plan view.
Figure 3:
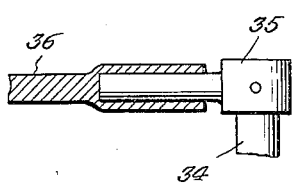

Figure 3 is a fragmentary detail, with parts broken away and shown in section, and illustrating the connection for the resilient signal arm with the shaft for operating the same, Figure 4 is a plan view of the operating mechanism with the cover of the container removed, Figure 5 is a vertical transverse sectional view, Figure 6 is a vertical longitudinal sectional view taken substantially along a line 6—6 of Figure 4, Figure 7 is a similar view taken along a line 7—7 of Figure 4, Figure 8 is a fragmentary side elevation of the container illustrating the recess portion provided for accommodating the swinging of the signal arm, Figure 9 is a perspective view of the pivoted trip plate, and Figure 10 is a detail of the adjusting means for said trip, taken substantially along a line 10—10 of Figure 6.

Referring now to the drawings in detail, wherein for the purpose of illustration I have disclosed a preferred embodiment of the invention, the numeral 5 designates a metal container adapted to be recessed within the ground adjacent the curb stone of the street and having a lid 6 secured upon the upper edges of the container with a gasket 7 interposed between the lid and the edges of the container to form a liquid tight fit therefor.

A pair of spaced parallel supporting plates 8 depend within the container from the under side of the cover upon which the operating mechanism for the device is carried so that the same may be removed from the container together with the cover.

A plurality of shafts, designated at 9, 10, 11 and 12 are journaled between the supports 8, in spaced parallel relation. A gear 13 is freely mounted on the shaft 9, with which a train of gearing indicated generally at 14 is engaged, said gearing being keyed to the shaft 10, 11 and 12 in intermeshed relation as clearly illustrated in Figure 4 of the drawings.

The shaft 12 is also provided with a gear 15, which is keyed thereto and is controlled by an escapement lever 16 operated by a clock escapement mechanism (not shown) mounted within a casing 17 secured in a suitable position within the container.

A ratchet wheel 18 is secured at one side of the gear 13 and with which a pawl 19 is operatively associated. The pawl 19 is pivotally carried at the outer end of a lever 20 keyed at its inner end to the shaft 9. The outer end of the lever 20 is pivotally attached to a link 21 which extends upwardly with its upper end pivotally connected to a plunger 22. The plunger 22 extends outwardly through the cover 6 through a suitable packing gland 23 to a position outwardly of the cover and carries a foot tread or pedal 24 at its upper end.

The foot tread 24 is disposed upon a spring member 25, constructed in the shape of a dome which has its lower edges resting upon its upper surface of the cover 6. The dome 25 is constructed of spring material and operates to yieldably urge the plunger 22 upwardly.

A collar 26 is formed adjacent the lower end of the plunger and is engageable with the packing gland 23 whereby to limit the upward movement of said plunger. The shaft 9 is also provided with a lever 27 which is keyed at one end to each shaft and is provided at its opposite end with a pin 28 slidably positioned within a slotted opening 29 formed in a horizontally disposed rod 30.

A coil spring 31 is attached at one end to one end of the rod 30 with the other end of the spring secured to a bracket 32 depending from the cover 6. The opposite end of the rod 30 is pivotally attached to a lever 33 keyed to a rock shaft 34 journaled within the casing, adjacent the upward portion thereof and with one end of said rock shaft protruding outwardly at one side of the casing. A short post 35 is fixedly attached to the outer end of the rock shaft 34, said post being inserted within the recessed end of a signal arm 36, preferably constructed of semi-rigid rubber and which is adapted to swing vertically and horizontally into and out of signalling position upon the operation of the shaft 34. The side of the container 5 adjacent the outer end of the rock shaft 34, is recessed as shown at 37 to permit the swinging movement of the signal arm and to prevent its swinging movement beyond a predetermined downward position.

The bar 30, disposed within the container, is provided with a pivoted trip plate 38, illustrated in detail in Figure 9 of the drawing, with one end of the plate adapted to engage a stop 39 formed on support 8.

The opposite end of said plate is engaged by a screw 40 carried by a bracket 41 secured to the bar 30. A leaf spring 42 engages the end of the trip plate remote from the set screw for yieldably retaining the plate in engagement therewith. The stop 39 is positioned with respect to the plate so that upon the movement of the bar 30 in a manner for lowering the signalling arm, the free end of the trip place will engage the stop and prevent the upward movement of said signalling arm.

This movement of the bar 30 for lowering the signalling arm, is accomplished by depressing the plunger 22 by a person stepping upon the said plate 24. This action results in a partial rotation of the shaft 9 through the lever 20 and link 21 which it will be apparent will cause a movement of the rod through its engagement with the shaft 9 by the lever 27 and pin 28.

The spring 31 serves to urge the bar in an opposite direction upon the releasing of the trip plate from the stop 39.

This releasing action is accomplished by an upward movement of the rod 30 by the lever 27 during the rotation of the shaft 9 in a predetermined direction. The shaft 9 is normally held against rotation in a direction for raising the rod 30 upwardly by reason of the engagement of the gear 13 with the train of gearing 14 and which gearing is operated by the clock escapement mechanism.

Accordingly the shaft 9 will be rotated by the clock escapement mechanism at a relatively slow rate of speed and in accordance with the manner in which the clock escapement mechanism is regulated.

A coil spring 43 is disposed about the shaft 9 with one end of the spring attached to one of the supports 8 and the opposite end thereof secured to the disk 44 secured to the shaft by a pin 44′. The disk 44 is hexagonally or otherwise shaped for receiving a wrench whereby to enable the adjusting of the tension of the spring. The spring is positioned in such a manner that the rotation of the shaft during the depression action of the plunger 22 will result in an increase in the tension of the spring, this tension of the spring being applied to the shaft for returning the same to its original position, as the same is slowly released by the clock escapement mechanism and to assist in the rotation of the shaft to perform the lifting action of the rod 30 for releasing the same from the stop 39.

In the operation of the device the motorist who parks his automobile adjacent the signalling device steps upon the step plate 24 for depressing the plunger which serves to lower the signalling arm. As the shaft is slowly released by the escapement mechanism the plunger 22 is permitted to be moved upwardly by reason of its engagement with the ratchet wheel 18 and as soon as the rod 30 has been raised a sufficient extent by the lever 27 the rod will be released and the springs 31 and 43 will cooperate to rotate the shaft 34 for raising the signalling arm upwardly and thus to indicate that the parking limit for the automobile has expired. Should the motorist move his car before the expiration of the time required for releasing the signal arm and another motorist then park his car in the vacated space, he may reset the device to obtain his full parking time by stepping upon the step plate whereby to move the lever 27 to its lowermost position. This repeated resetting of the device will not interfere with the continuous operation of the gears by the clock escapement mechanism by reason of the pawl and ratchet connection between the freely mounted gear 13 and the step plate.

The base of the container may be supplied with a quantity of suitable light lubricant for oiling the moving parts of the device and to assist in preventing the rusting of the parts.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A signalling device of the class described comprising a container, a signalling arm, a rock shaft for the arm extending through the container, a plunger extending outwardly of the container, means operatively connecting the plunger with the rock shaft for operating the signal arm in a predetermined manner upon the actuation of the plunger, trip means for releasably securing the signalling arm against movement after actuation of the plunger, spring means for returning the plunger and the signalling arm to their original position, and time control means for releasing said trip means having a step by step movement.

2. A signalling device of the class described comprising a container, a signalling arm, a rock shaft for the arm extending through the container, a plunger extending outwardly of the container, means operatively connecting the plunger with the rock shaft for operating the signal arm in a predetermined manner upon the actuation of the plunger, trip means for releasably securing the signalling arm against movement after actuation of the plunger, spring means for returning the plunger to its original position, spring means for returning the signalling arm to its original position, and time control means having a step by step movement and operatively associated with said trip means and said last named spring means for retarding trip releasing movement.

3. A signalling device of the class described comprising a container, a rock shaft extending therefrom, a signalling arm attached to the outer end of the shaft, a shaft journaled in the container, a depressible member extending outwardly of the container and operatively connected to said last named shaft, spring means for urging the member outwardly, a train of gearing operatively connected with the last named shaft and the depressible member, time control means having a step by step movement for operating said gearing and adapted to gradually release the member after its depressing movement and means for controlling the actuation of the rock shaft in a predetermined manner during the depressing and releasing movement of the member.

4. A signalling device of the class described comprising a container, a rock shaft extending therefrom, a signalling arm attached to the outer end of the shaft, a shaft journaled in the container, a depressible member extending outwardly of the container and operatively connected to said last named shaft, spring means for urging the member outwardly, a train of gearing operatively connected with the last named shaft and the depressible member, time control measn for operating said gearing and adapted to gradually release the member after its depressing movement, an actuating bar for the rock shaft, a trip engaging the bar for securing the signalling arm in a predetermined position and means operatively connecting the bar with the depressible member whereby to respectively move the arm out of signalling position and to release the trip from the opposite movement of the member.

5. A signalling device of the class described comprising in combination, a container, a signalling arm mounted thereon, a depressible member, means connecting the signalling arm for movement out of signalling position by the depressing action of said member, trip means releasably securing said arm out of signalling position and arranged for releasable actuation by an operative movement of the member and an escapement mechanism operatively connected with the member for gradually releasing the same from its depressed position.

6. A signalling device of the class described comprising in combination, a container, a signalling arm mounted thereon, a shaft, a pair of levers attached thereto, a depressible member operatively connected to one of said levers, a bar connecting the other of said levers with said arms, trip means releasably engageable with the bar for securing the arm in a predetermined position, an escapement mechanism operatively connected with the member connected lever for releasing both the member and the trip means and spring means urging the member out of depressed position.

7. A signalling device of the class described comprising a signalling arm, mechanism for moving the arm into and out of signalling position, trip means carried by the mechanism for releasably securing the signalling arm out of signalling position, spring means operatively associated with the mechanism for urging the same into trip releasing position and time control means having a step by step movement and operatively associated with said mechanism for retarding the releasing movement of the trip means.

8. A signalling device of the class described comprising a movable signalling arm, a manually operable member for moving the arm out of signalling position, spring means for moving the arm into its operative position, trip means releasably securing the arm in its first named position and time controlled means having a step by step movement for retarding releasing movement of said trip means.

9. A signalling device of the class described comprising a container, a rod shaft extending therefrom, a signalling arm attached to the outer end of the shaft, a shaft journaled in the container, a depressible member extending outwardly of the container and operatively connected to said last named shaft, spring means operating upon the shaft for urging the depressible member outwardly, a train of gearing, pawl and ratchet means connecting the shaft and the gearing whereby to subject the gearing to the action of said spring means, an escapement mechanism for retarding movement of the gearing, a reciprocable bar connected at one end to said rock shaft, a trip carried by the bar for securing the signalling arm in a predetermined position and means connecting the opposite end of the bar to the other of said shafts for releasing the trip upon a predetermined movement of said shaft.

10. A signalling device of the class described comprising a container, a rod shaft extending therefrom, a signalling arm attached to the outer end of the shaft, a shaft journaled in the container, a depressible member extending outwardly of the container and operatively connected to said last named shaft, spring means operating upon the shaft for urging the depressible member outwardly, a train of gearing, pawl and ratchet means connecting the shaft and the gearing whereby to subject the gearing to the action of said spring means, an escapement mechanism for retarding movement of the gearing, a reciprocable bar connected at one end to said rock shaft, spring means yieldably supporting the opposite end of the bar for limited vertical movement, a trip carried by the bar and adapted to secure the signalling arm in a predetermined position when the bar is in its lowermost position and means operatively connecting the spring supported end of the bar to the other of said shafts for raising the bar into trip releasing position upon a predetermined movement of said shaft.

In testimony whereof I affix my signature.

JOHN B. MORTON, Jr.